June 17, 1924.
S. F. ZALOOM
ROASTING MACHINE
Filed June 21, 1922
1,497,826
2 Sheets-Sheet 1
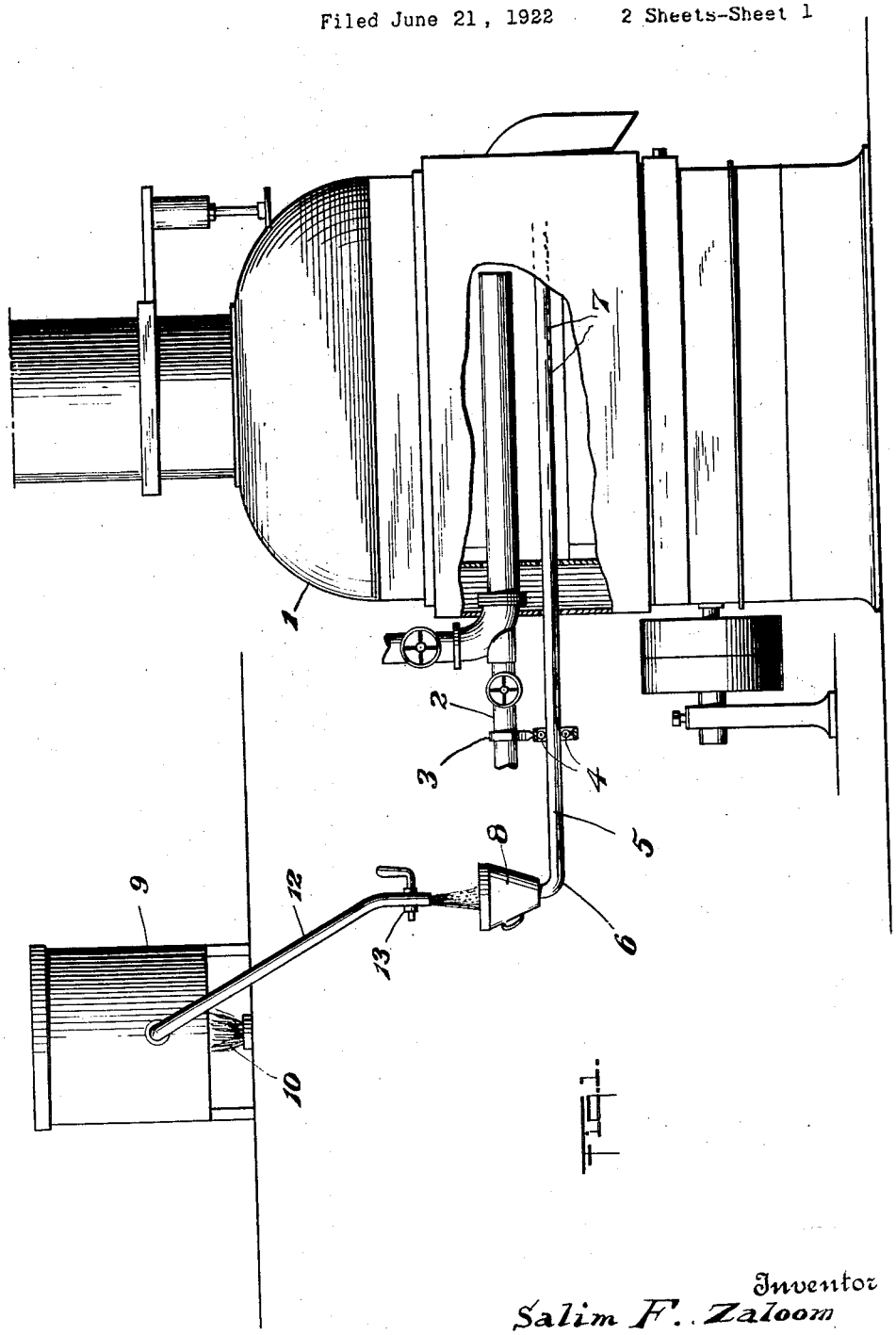
Inventor
Salim F. Zaloom
By Attorney
Mason Fenwick & Lawrence June 17, 1924.  1,497,826
S. F. ZALOOM
ROASTING MACHINE
Filed June 21, 1922   2 Sheets-Sheet 2
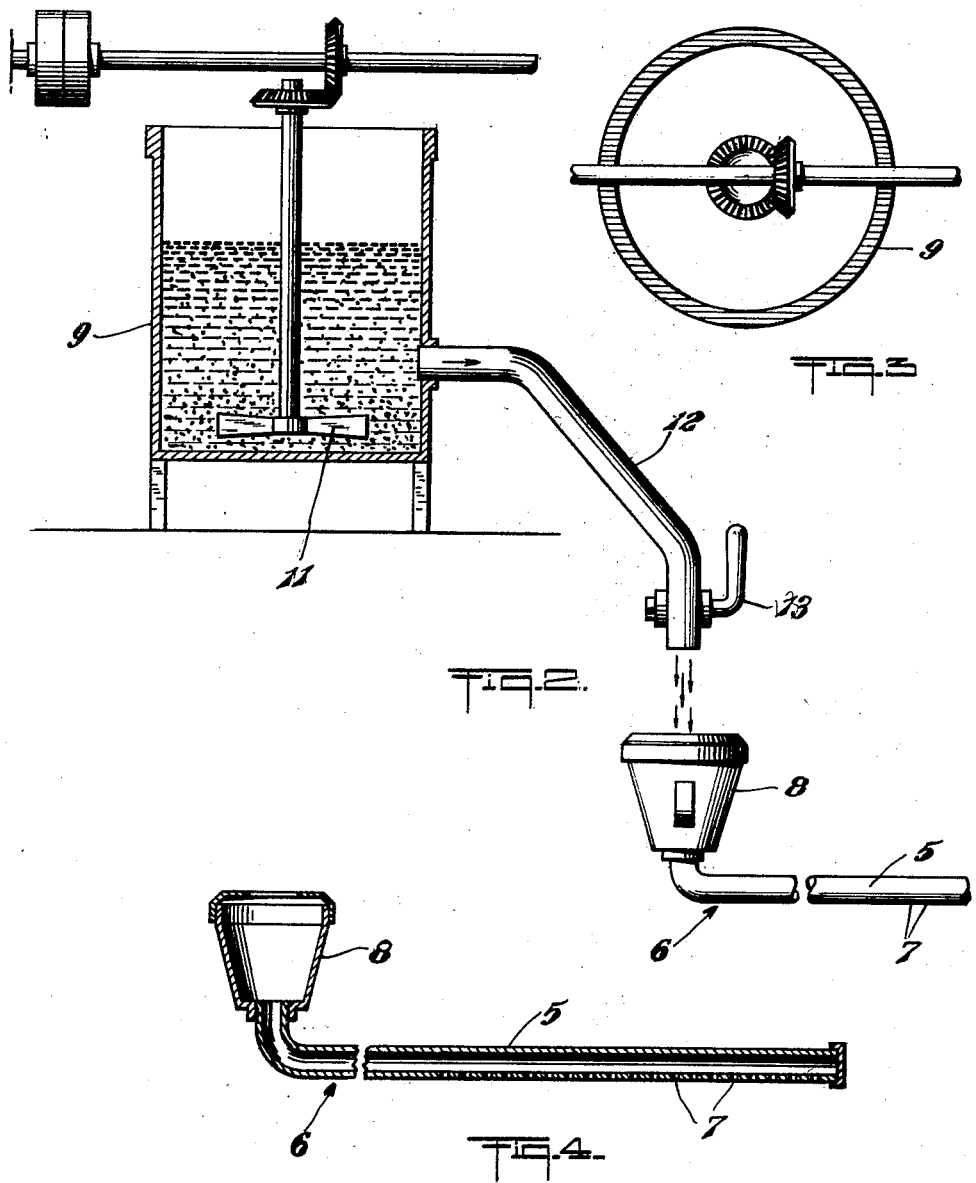

Patented June 17, 1924.

1,497,826

UNITED STATES PATENT OFFICE.

SALIM F. ZALOOM, OF BROOKLYN, NEW YORK.

ROASTING MACHINE.

Application filed June 21, 1922. Serial No. 569,971.

*To all whom it may concern:*

Be it known that I, SALIM F. ZALOOM, a subject of Turkey, residing at Brooklyn, in the county of Kings and State of New York, have invented certain new and useful Improvements in Roasting Machines; and I do hereby declare the following to be a full, clear, and exact description of the invention, such as will enable others skilled in the art to which it appertains to make and use the same.

This invention relates to means for applying coating, salt, flavoring or other ingredients to a roasted product, such as pistachio nuts.

The objects of the invention are to obtain an even application of the ingredient through the product; to apply the ingredient while thoroughly mixed and dissolved; to provide a direct passage from the ingredient container to the roaster; to provide improved means for spraying the ingredient upon the product; to permit the spraying means to be removed from the roaster while not in use; to secure simplicity of construction and operation and to obtain other advantages and results as may be brought out in the following description.

Referring to the accompanying drawings in which like numerals of reference indicate similar parts throughout the several views, Figure 1 is a side elevation of a roaster partially broken away and showing my invention applied thereto;

Figure 2 is a sectional view of the ingredient container with the agitator and the spraying device in elevation;

Figure 3 is a plan of the said container; and

Figure 4 is a longitudinal section of the spraying device.

In the specific embodiment of the invention illustrated in said drawing reference numeral 1 indicates in general a roasting machine which has the usual roasting drum and heat applying means (not shown) customarily employed in a device of this character. It has heretofore been customary to employ a steam-pipe 2 for spraying steam on the product, and in carrying out my invention, I employ this steam-pipe 2 as a support for a bracket 3 for my invention. Bracket 3 is equipped with a pair of spaced rollers 4 which support and permit a pipe 5 to slide therebetween. This pipe 5 forms a part of the spraying device 6 forming a part of my invention, and the arrangement is such that the said pipe may be slid into or out of the roasting machine longitudinal of the roasting drum. The operation of this pipe 5 which may be slid into the roasting machine is provided with a plurality of spray holes 7, and at the upper end of said pipe is provided a suitable funnel 8 for introducing the liquid ingredient into the pipe. It is to be understood that during normal operation of the roaster, pipe 5 is withdrawn so as not to be within the roaster and will thus not interfere with the roaster and will thus not interfere with the product being roasted nor be affected by the heat or wear from the product.

The ingredient introduced into funnel 8 in liquid condition will rapidly fill pipe 5 and will spray through holes 7 on to the product as it is agitated within the roaster, and by this means a very even application of the ingredient will be obtained upon the product.

As the ingredient is one which readily precipitates, I preferably employ a container 9 situated above the spraying device 6 and adapted to be heated as at 10 and also provided with an agitator 11. By this means the ingredient is kept thoroughly mixed and constantly ready for use. A suitable pipe 12 controlled by valve 13 is provided for conducting the ingredient from the container 9 to the funnel 8. When the spraying device is inserted in the roasting machine, the funnel 8 is beneath the lower end of pipe 12 ready to receive the ingredient and by having a valve 13 near the lower end of said pipe the operator can very conveniently manipulate the funnel 8 and valve 13 at the same time. The ingredient may be introduced as slowly or rapidly as found necessary and can be very quickly stopped by turning off valve 13.

Obviously detail changes and modifications may be made in the construction and use of my invention, and I do not wish to be understood as limiting myself except as required by the following claim when construed in the light of the prior art.

Having thus described my invention, I claim:

In combination with a roasting machine, a slidable pipe adapted to be introduced into the roasting machine and having perforations through which an ingredient may be sprayed on the product within the machine, a bracket for slidably supporting said pipe, a funnel on the outer end of said pipe for receiving an ingredient and transmitting the same to the pipe, and means for supplying an ingredient to the funnel.

In testimony whereof I affix my signature.

SALIM F. ZALOOM.